J. W. DODGE.

Branding Apparatus.

No. 5,420. Reissued May 20, 1873.

Witnesses
Saml. M. Barton
F. H. Smith

Inventor
J. Wesley Dodge
by his atty
Lawrence D. Wright

AM. PHOTO-LITHOGRAPHIC CO. N.Y. (OSBORNE'S PROCESS)

UNITED STATES PATENT OFFICE.

J. WESLEY DODGE, OF MALDEN, MASSACHUSETTS.

IMPROVEMENT IN BRANDING APPARATUS.

Specification forming part of Letters Patent No. 89,829, dated May 4, 1869; reissue No. 5,420, dated May 20, 1873; application filed March 7, 1872.

*To all whom it may concern:*

Be it known that I, J. WESLEY DODGE, of Malden, in the county of Middlesex and State of Massachusetts, have invented an Improved Branding Apparatus; and I do hereby declare the same to be fully described in the following specification and represented in the accompanying drawing, of which—

Figure 1:
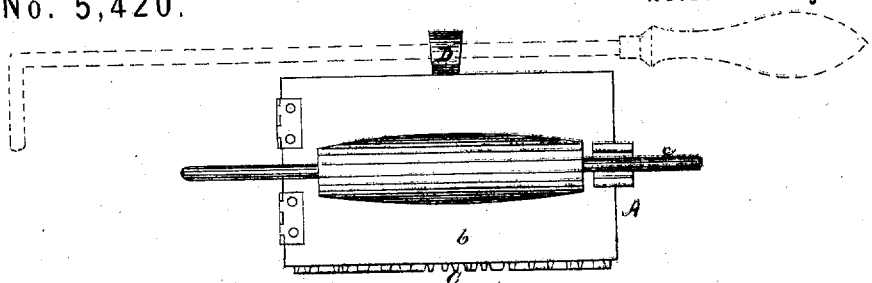
Figure 3:
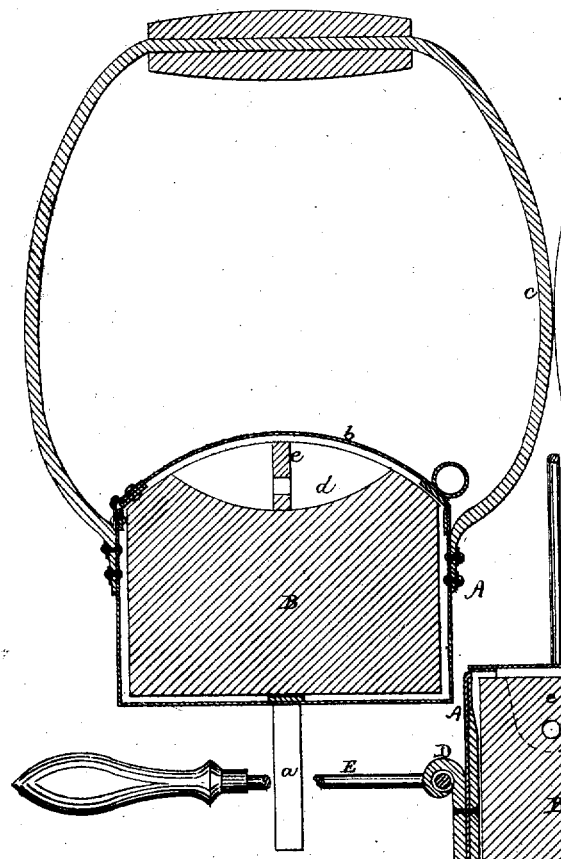
Figure 2:
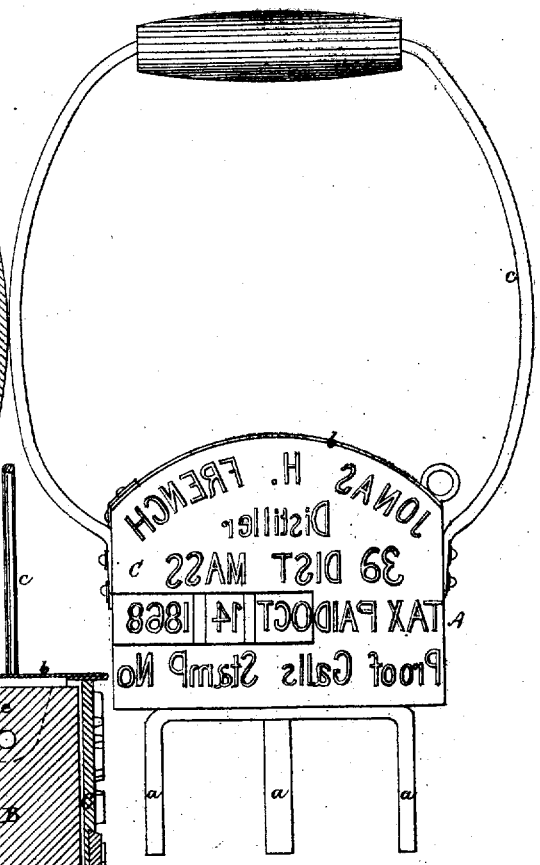
Figure 4:
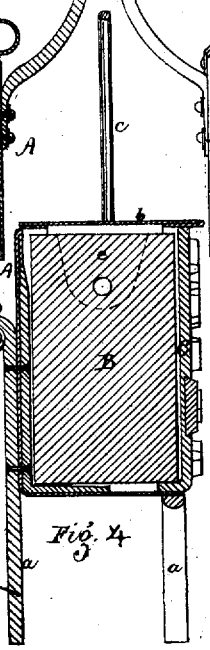

Figure 1 denotes a top view; Fig. 2, a side elevation; Figs. 3 and 4, vertical sections of it, they being taken in planes at right angles with each other and through the center of the heater-chamber.

In such drawing, A denotes a box provided with supporting-legs *a a a*, a cover, *b*, and a bail, *c*. This box is designed to receive and hold a heater, B, which usually consists of a block of cast-iron formed with a recess, *d*, in its upper part, and having a bridge, *e*, extending across such recess. The branding-types are to be fixed or applied to, and are to project from, one side of the said box, as shown at C in the drawing; or such side may constitute a type-holder made with one or more grooves dovetailed in cross-section, such groove or grooves being to receive the types. Furthermore, there is applied to the other side of the box, and so as to project through an eye or tubular projection, D, a hooked rod or handle, E, formed as represented, which, when in the eye, serves to enable a person, by the power of his right hand, to force the branding case or box, or the lettered side thereof, against a surface to be branded, such case being held, in the meantime, up to such surface by the other hand of the person having hold of the bail of the case or box. Furthermore, the hooked rod E, when removed from the eye, serves another purpose, viz., to enable a person to remove the heater from the box or introduce it therein when such heater may be in a heated state.

My apparatus, as described, is designed especially for branding the head of a barrel when the barrel may be resting on the ground, so as to bring the head in an upright position, and in this instance the hooked rod is essential; but my branding apparatus is also used to brand a horizontal surface, pressure upon the bail being then sufficient to brand the object.

To use the apparatus, the heater should first be heated to a red or scorching heat; after which it should be introduced into the box. The box is next to be brought to bear upon the surface to be branded, and the branding-projections should be placed in contact with such surface, and pressed against it by force applied to the hooked rod or bail. The feet operate not only to support the box on a surface, but as insulators of it to prevent the too rapid abstraction of its heat by such surface.

My invention or apparatus is designed also to save the necessity of turning head up a heavy hogshead or barrel when it may be desirable to brand it; and in this respect it is of great advantage to distillers, brewers, grocers, and others.

I am aware that an embossing-die has been chambered to receive a hot iron for the purpose of heating the die. I am also aware that smoothing-irons, for ironing clothes, have been chambered and provided with heating-irons. I therefore do not claim such in the abstract, nor the principle, as applied to my branding apparatus.

It will be seen that the box to receive the heater-iron is left unobstructed by the handle, which is made as a bail, and that the bail, by being rigidly attached to opposite sides of the box, not only forms no obstruction to the introduction and removal of the heater-iron, but, by its rigid connection to the box, enables the brand to be more conveniently handled and applied than if the bail were loose.

What I claim is—

1. The arrangement and combination of hooked handle, the eye, and the bail with a brander or branding-box, provided with branding devices, and made to receive a heater, as described.

2. A brand, having the box or case that receives the heater-iron rigidly attached, at its opposite sides, to the opposite arms of a bail, substantially as shown and described.

In testimony whereof I have signed my name to this specification in the presence of two subscribing witnesses.

J. WESLEY DODGE.

Witnesses:

SAML M. BARTON,
CARROLL D. WRIGHT.